United States Patent [19]

Kim

[11] Patent Number: 5,267,599
[45] Date of Patent: Dec. 7, 1993

[54] SUNSHIELD

[76] Inventor: Ki I. Kim, 21234 Stockton Pass Rd., Walnut, Calif. 91789

[21] Appl. No.: 952,361

[22] Filed: Sep. 28, 1992

[51] Int. Cl.⁵ .............................................. B60J 3/00
[52] U.S. Cl. .............................. 160/370.2; 160/DIG. 3
[58] Field of Search ....... 160/370.2, DIG. 2, DIG. 3, 160/405; 296/97.7, 97.8, 97.9, 97.1, 95.1

[56] References Cited

U.S. PATENT DOCUMENTS

| | | | |
|---|---|---|---|
| 2,874,770 | 2/1959 | Rohr et al. | 296/97.8 X |
| 3,279,845 | 10/1966 | Lutz | 160/370.2 X |
| 4,317,481 | 3/1982 | Oswald | 160/84.1 |
| 4,422,492 | 12/1983 | Bledsoe | 160/84.1 |
| 4,535,828 | 8/1985 | Brockhaus | 160/84.1 |
| 4,707,018 | 11/1987 | Gavagan | 160/DIG. 3 X |
| 4,848,825 | 7/1989 | Niernberger | 160/370.2 X |
| 4,865,106 | 9/1989 | Wichelman | 160/84.1 |
| 4,903,748 | 2/1990 | Foraker | 160/370.2 |
| 5,035,460 | 7/1991 | Huang | 296/97.7 X |
| 5,076,633 | 12/1991 | Hsu et al. | 296/97.8 X |

Primary Examiner—David M. Purol
Attorney, Agent, or Firm—Lyon & Lyon

[57] ABSTRACT

A sunshield for shading the interior of an automobile comprising one or more layers of thin, flexible material and having a sufficient internal structure as necessary to retain the sunshield in a rigid posture while secured across the interior side of an automobile windshield. In one aspect, the internal structure comprises a thin, support band having a resilient, arcuate cross-section. In another aspect, a series of creases formed alternately in opposite sides of the sunshield provide the necessary rigidity. In preferred embodiments, the body of the sunshield comprises materials having both insulative and reflective properties.

8 Claims, 4 Drawing Sheets

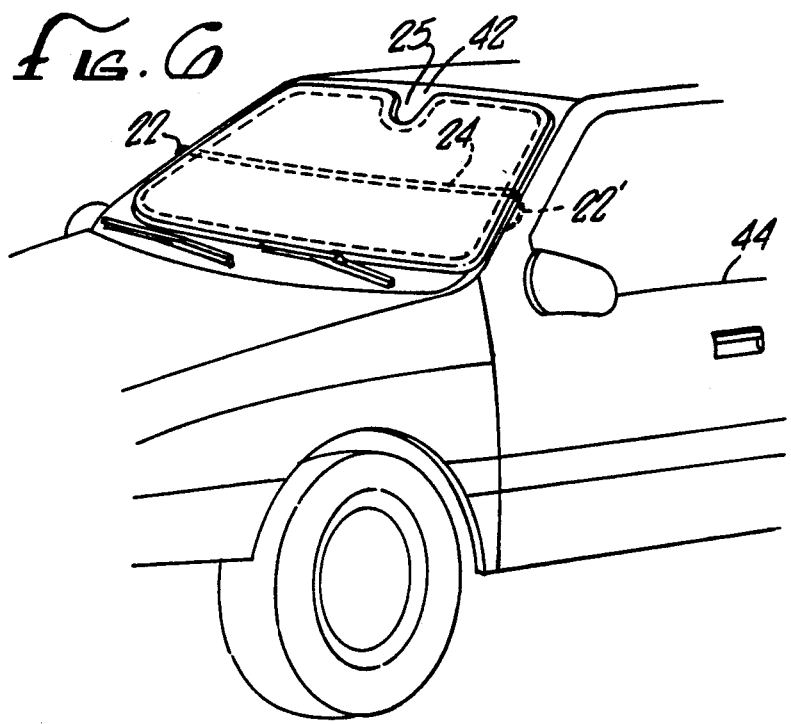
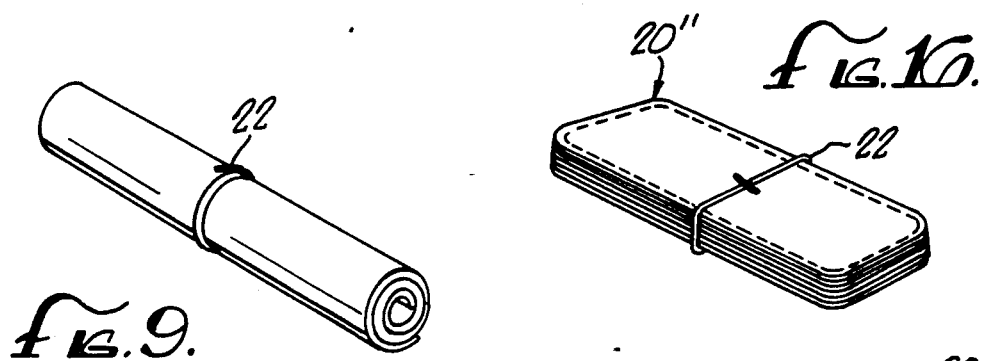
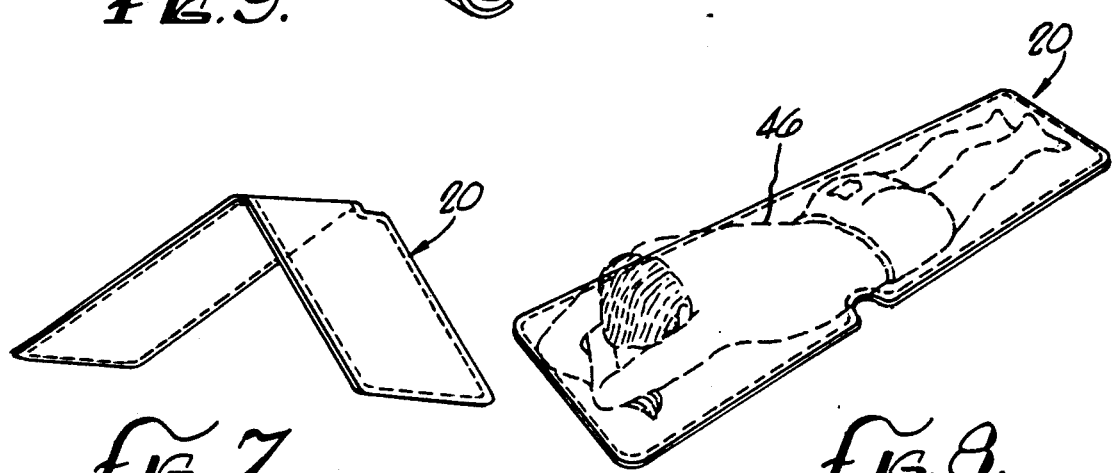

SUNSHIELD

BACKGROUND OF THE INVENTION

The field of the present invention is sunshields and, more particularly, portable sunshields for automobile windows to protect the interior of the automobile from the sun's rays while the automobile is parked.

Various sunshield devices are known in the art, including ones designed for positioning on the interior of an automobile windshield, as well as ones designed for exterior applications. For example, known interior shields include: a folding cardboard shade, such as that shown in U.S. Pat. No. 4,202,396; a fan-like venetian blind, such as that shown in U.S. Pat. No. 4,332,414; or even collapsible, fabric covered loops, such as that shown in U.S. Pat. No. 4,815,784.

In each instance, a balance must be struck between ease and flexibility of use, quality of protection provided, ease of storage, and unit cost. However, achieving this balance has proved somewhat elusive in the known art. For example, a folding cardboard shade is inexpensive and easy to store, but it provides mediocre insulation and has poor reflective qualities. Further, cardboard is not very flexible, e.g., it will permanently deform when folded or bent, and it tends to return to a folded shape. Also, cardboard is not suitable for exterior uses exposed to the elements. Fan-like venetian blinds are more expensive, require semi-permanent mounting and are also relegated to interior use. Their operation and storage is more cumbersome than is for a cardboard shade. Collapsible loops are awkward to assemble and dissemble and a fabric type material typically has inferior insulating and reflective qualities.

Ideally, a sunshield will be highly flexible for ease in positioning and storage; lightweight, durable, easy to clean and, perhaps, useful for other functions. Further, the shield should be made of materials having superior insulating and reflective properties to achieve superior sun blockage.

SUMMARY OF THE INVENTION

The present invention is directed to providing an improved sunshield over the prior art, by providing a highly flexible shield with superior insulating and reflective material properties, but still having sufficient internal rigidity for maintaining a fixed position across the interior of an automobile windshield.

In one aspect, the sunshield comprises one or more layers of thin, flexible insulating material with its exterior surfaces covered by a layer of reflective metal. The insulating material reduces the amount of heat transferred by the suns rays to the interior of the automobile. In some embodiments, the reflective metal layer may be composed of aluminum foil, or a similarly flexible, reflective substance, and may also have a protective film coating, such as mylar. The inherent superior reflective characteristics of such a metallic exterior result in deflection of much of the intensity of the sun's rays, thereby increasing the protection provided by the sunshield. A thin support band having a resilient, arcuate cross-section, extends through the middle of the insulating material, typically in a lengthwise direction. The resilience of the band about its cross-section reinforces the otherwise collapsible insulating material, causing the body of the sunshield to maintain a "rigid", but flexible posture. Although the band's resilience operates primarily "widthwise," some "lengthwise" resilience is also present giving the sunshield some rigidity in this direction, as well. However, this lengthwise resilience is relatively small and the sunshield may be easily rolled up along its length for storage.

In a second aspect, the sunshield comprises similar insulating and reflective materials and has a plurality of creases, each crease being alternately located on opposite sides of the sunshield and extending along its width. The creases provide the internal structure necessary for maintaining a "rigid" posture, without significantly interfering with the flexibility of the sunshield. Further, the creases provide means for facilitating the folding of the sunshield for storage, while not causing the sunshield to tend to "fold itself" while in use. As embodied, the sunshield may be folded in an "accordion style," or in some other fashion, such as folded in half successively.

BRIEF DESCRIPTION OF THE DRAWINGS

Other objects and features of the present invention will become apparent from the following detailed description taken in connection with the accompanying drawings. It is to be understood, however, that the drawings are designed for illustrative purposes only and are not intended to define the limits of the invention.

In the drawings, wherein similar reference characters denote similar elements throughout the several views:

Fig. 6 is an exemplary perspective view of the sunshield positioned across a windshield of an automobile, with the latter shown in fragmentation;

FIG. 7 is an exemplary perspective view of a sunshield positioned as a shade for some object;

FIG. 8 is an exemplary perspective view of a sunshield being utilized as a mat for a person to lay across;

FIG. 9 is an exemplary perspective view of the sunshield rolled up along its length and tied with straps;

FIG. 16 is an exemplary perspective view of the sunshield embodying either the first or second aspect of the present invention folded "accordion style" and tied with straps.

DETAILED DESCRIPTION

Figure 1:
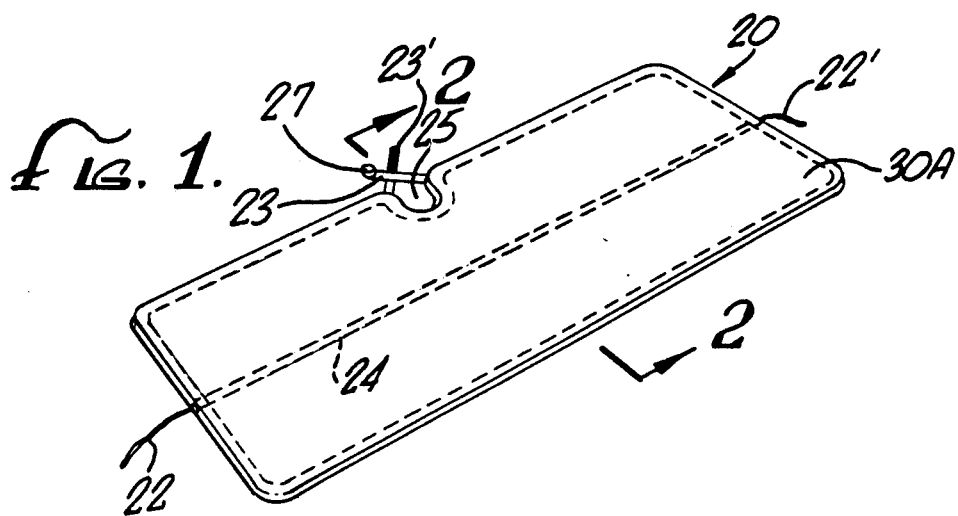
FIG. 1 is a perspective view of a sunshield embodying a first aspect of the present invention.

Turning in detail to the drawings, FIG. 1. illustrates a sunshield 20 embodying a first aspect of the present invention, with the sunshield having a length and a width. Tie straps 22 and 22', respectfully, are attached at opposite ends of sunshield 20, said ends defining its length. Proximate the center of the width of sunshield 20, the location of a thin, resilient support band 24 is shown in phantom. Cutaway portion 25 is provided to facilitate a proper fit around a rear view mirror when positioning the sunshield across the interior side of an automobile front windshield. A pair of velcro straps 23 and 23', respectively, are attached to the sunshield proximate cutaway portion 25. A suction cup 27 is attached to an end of strap 23. The velcro straps wrap interlockingly about the connection stem of the rear view mirror, when the sunshield is positioned across the interior side of the windshield. The suction cup may then be secured to the glass of the windshield. This arrangement helps to support the sunshield and affix its position close to the windshield. In different embodiments, differing combinations of tie straps and/or suction cups may be attached to the sunshield within the scope of the present invention.

Figure 2:
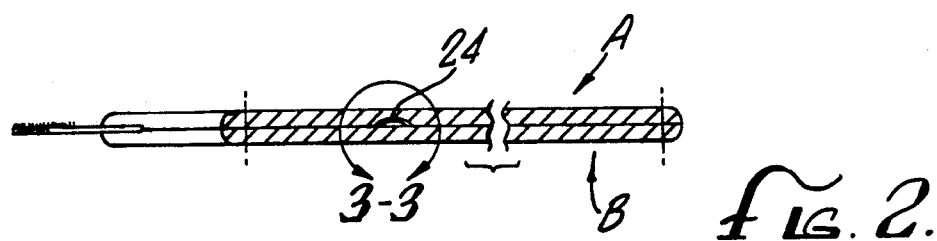
FIG. 2. is an enlarged cross-sectional view taken along lines 2—2 of FIG. 1.
Figure 3:
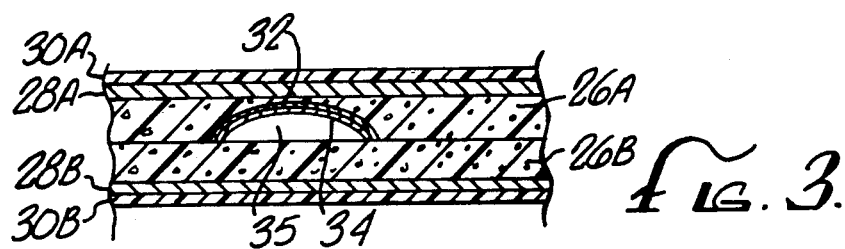
FIG. 3 is a further enlarged cross-sectional view taken along the area of line 3—3 of FIG. 2.

Referring now to FIG. 2, which illustrates that sunshield 20 has two adjacent sides, A and B, respectfully, with support band 24 having an arcuate cross-section and positioned between the two sides. As is best seen in FIG. 3, sides A and B each comprise multiple layers of material. Adjacent layers of insulating material 26A and 26B, respectfully, form the main body portion of sunshield 20. In some embodiments, the insulating material may be comprised of foam or a similar substance that is flexible but somewhat self-supporting or rigid. A layer of reflective material 28A and 28B, respectively, covers the exterior surface, i.e., the non-adjacent surface, of insulating layers 26A and 26B, respectfully. In some embodiments, this reflective layer may be comprised of thin aluminum foil, or some other flexible, reflective metal. A film coating 30A and 30B, respectively, covers the exterior surface of reflective layers 28A and 28B, respectfully, for protection. In some embodiments, this coating may be mylar, or the like.

Support band 24 may be comprised of a flexible metal or some other substance having the appropriate resilience. In the embodiment shown in FIG. 3, support band 24 comprises two thin members, 32 and 34, respectively, which themselves are comprised of a flexible, resilient material. This design technique of using multiple members to form the band increases its overall thickness and thereby increases the strength of resilience about its cross-section. An air pocket 35 is formed under a concave side of the arcuate cross-section of support band 24, proximate member 34.

Figure 4:
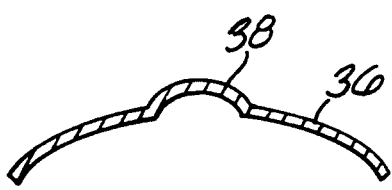
FIG. 4 is an enlarged cross-section of an alternatively designed support band having a v-shaped portion in its mid-section.

In FIG. 4, an alternatively designed support band 36 is illustrated. Band 36 has a raised, "v-shape" portion 38 proximate the middle of its cross-section. V-shape portion 38 gives band 36 additional resilient strength about is cross-section. In the embodiment shown, band 36 is comprised of a single member, as opposed to the multi-member design of band 24 shown in FIG. 3. In practice, the band may be designed with any number of member layers, sections, or subcomponents. Further, the uniform arcuate band 24 shown in FIG. 3 and the v-shape band shown in FIG. 4 are both intended as examples of the possible embodiments of the present invention and are not intended as a limitation. This aspect of the invention, as disclosed, is a sunscreen comprised of flexible insulating and/or reflective materials and having the necessary internal structural rigidity to maintain a substantially flat and upright posture when positioned across the interior of an automobile windshield. The embodiments disclosed herein are merely exemplary of this inventive concept.

Specifically, when the width of a sunshield not having sufficient internal rigidity is positioned "upright" across the interior of the windshield, the weight of the material will cause the sunshield to "droop" and fall out of position. Thus, while a combination of flexible insulating and reflective layers are easy to manipulate and provide superior protection from sunlight, their inherent lack of substantial stiffness will otherwise cause the sunshield to collapse and be ineffective, absent the provisioning of some means for retaining an internal rigid posture. In the embodiment shown in FIGS. 1-4, a first aspect of the invention discloses use of a thin, resilient support band as a means for providing the necessary internal rigidity. As the sunshield starts to droop, or fold over about its width, the resilience of the band causes the sunshield to resume its shape by exerting a countering force against the weight of the insulating and reflective layers, thereby causing the body of the sunshield to remain in an upright "rigid" posture. Because the support band extends lengthwise through the body of the sunshield, it also provides a "spine-like" influence on the sunshield. Thus, inclusion of a support band is one way of providing internal structural rigidity for the sunshield, as called for by the present invention.

Figure 5:
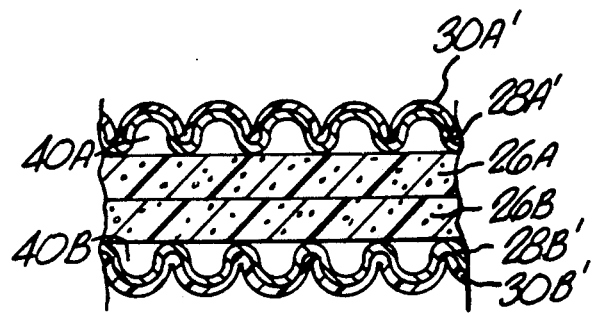
FIG. 5 is an enlarged cross-section of a portion of the composite material of the sunshield, with its surface layer and coating having been crinkled.

As a way of illustrating an alternative surface design, FIG. 5 shows a cross-section of the sunshield wherein reflective layers 28A' and 28B', and coating layers 30A' and 30B', respectively, have been "crinkled." This may be accomplished by applying heat to the outer surfaces of the sunshield, or by some other means, and results in the affected layers taking on a somewhat "rolling" shape. With this crinkled surface, pockets of air 40A and 40B, respectively, are formed between insulating layers 26A and 26B and crinkled reflective layers 28A' and 28B', respectively. This crinkled surface design increases the protective efficiency of the sunshield and is disclosed to exemplify one of several alternative surface designs that are possible within the scope of the present invention.

Referring now to FIG. 6, where the sunshield is shown positioned across the exterior surface of a front windshield 42, of an automobile 44. Tie straps 22 and 22' are secured in the passenger and driver side door jams, respectfully, of automobile 44 to secure the sunshield in place. While FIG. 6 illustrates an exterior application, the sunshield may also be positioned across the interior of the windshield, held in place by the frame of the windshield and dashboard of the automobile, as well as by the support provided by band 24, which, as explained above, causes the sunshield to retain a "rigid" posture. The use of velcro straps 23 and 23' and/or suction cups 27, as illustrated in FIG. 1, is additionally advantageous for anchoring the sunshield to the interior side of the windshield.

FIGS. 7 and 8 provide exemplary views of the sunshield in alternative uses. In FIG. 7, the sunshield is shown in use as a shade for some object; (e.g., a cooler, or an infant in a car seat). Notably, the support band allows the sunshield to remain in this position. FIG. 8 illustrates the sunshield being used as a mat for a sunbathing person 46 to lay across.

In FIG. 9, the sunshield is shown rolled up along its length and tied in the rolled condition by tie strap 22. Notably, while the resilience of the support band is sufficient to cause the sunshield to retain a rigid posture as against its own weight, the band is still amply flexible to allow the sunshield to be rolled up for storage, as shown. Further, although the band's resilience operates primarily widthwise, some lengthwise resilience is present, giving the sunshield some rigidity in this direction, as demonstrated in FIG. 7. However, this lengthwise resilience is relatively small.

Figure 10:
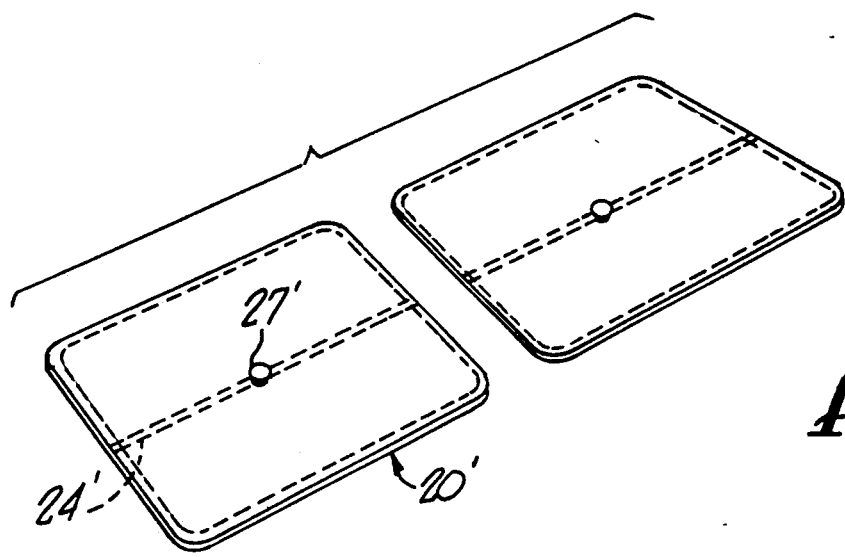
Fig. 10 is a perspective view of a pair of alternatively configured sunshields, each embodying the first aspect of the present invention.
Figure 11:
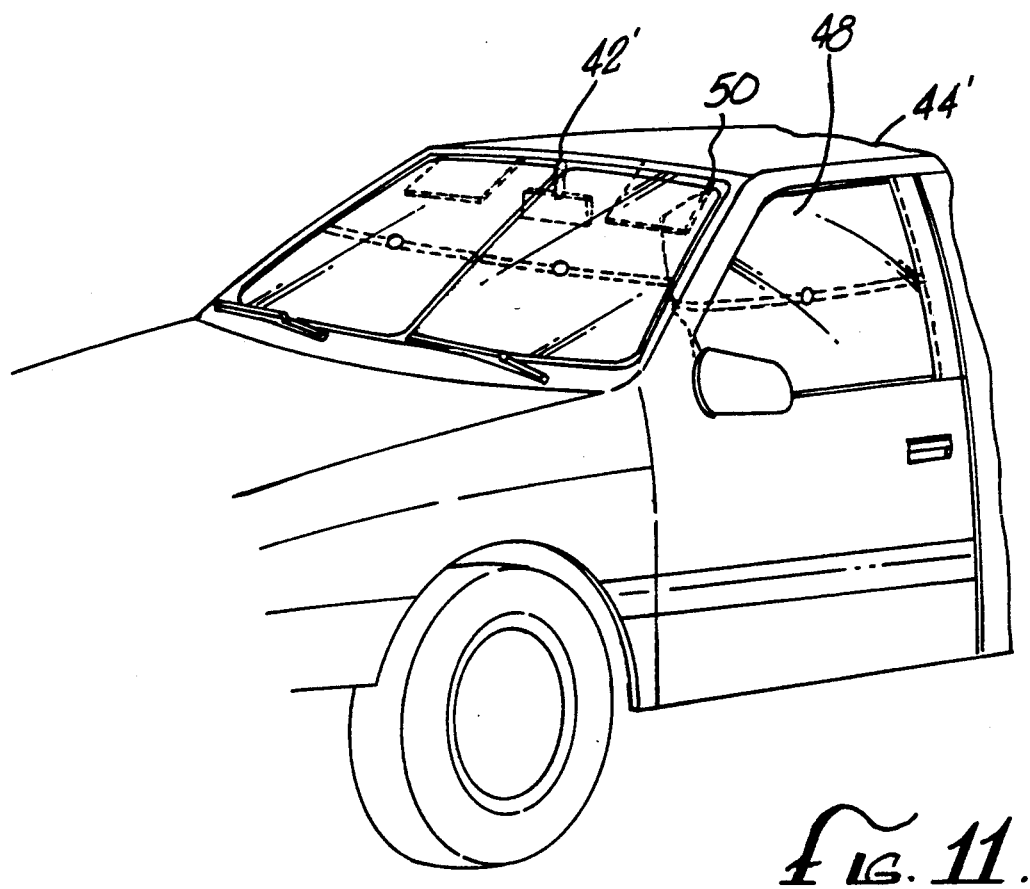
FIG. 11 is an exemplary perspective view of a plurality of sunshields illustrated in FIG. 10, positioned covering the interior windows of an automobile, with the latter shown in fragmentation.

Referring now to FIG. 10, a pair of alternatively configured sunshields 20' having the first aspect of the present invention are shown. Sunshield 20' is designed to accommodate smaller window portions of an automobile's interior. A suction cup 27' is attached proximate the center of sunshield 20' and preferably connected to band 24 for anchoring the sunshield to the window glass. FIG. 11 illustrates the application of a plurality of alternatively designed sunshields 20' to shade the interior of an automobile 44'. In the figure shown, two of the sunshields 20' are used to cover the interior side of front windshield 42' and a third sunshield covers driver side door window 48'. In most automobiles, the driver side window is not rectangular and so a folded over portion 50 of the sunshield is indicated in phantom in the drawing.

Figure 12:
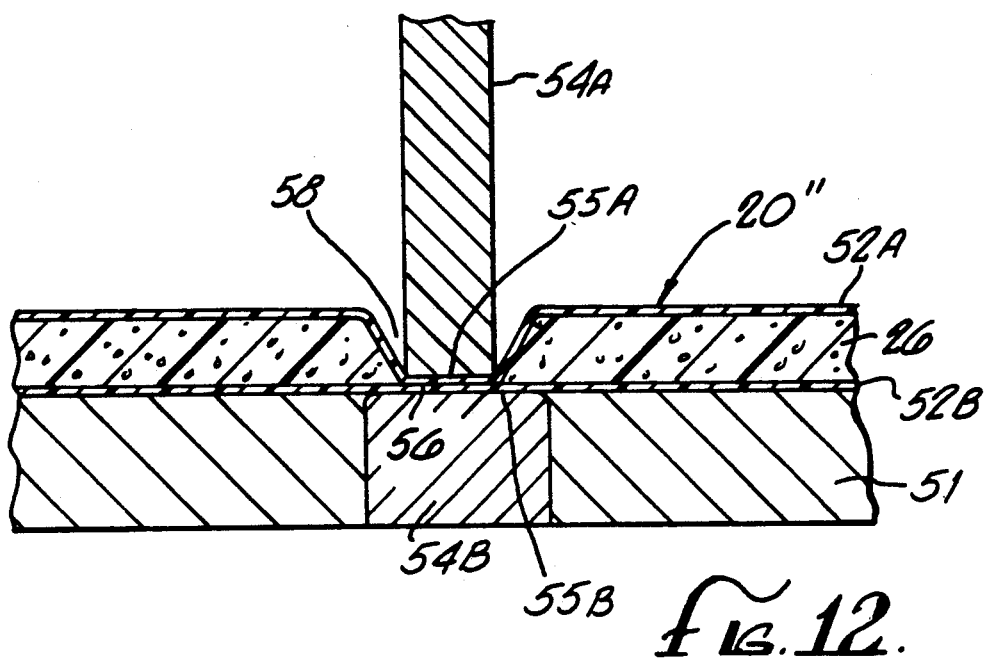
FIG. 12 is an exemplary cross-sectional view detailing a process for creating a crease in a surface of the sunshield in accordance with a second aspect of the present invention.

Referring now to FIG. 12, where a method is illustrated for producing a sunshield embodying a second aspect of the present invention, wherein a plurality of creases are heat pressed into the sunshield, each crease extending widthwise and generally running perpendicular to the length, and wherein each successive crease is formed on alternating sides of the sunshield. A sunshield 20" having an insulating layer 26 and two outer reflective layers 52A and 52B, respectively, is laid on a flat surface 51. Two pressing blocks 54A and 54B, respectively, are positioned wherein a flat surface 55B of block 54B is flush with flat surface 51. One or both of the blocks 54A and 54B are heated to a specified temperature, which varies according to the type of materials used in the sunshield. The heat of members 54A and 54B, along with the force of member 54A being pressed into the sunshield and against member 54B, creates a permanent crease in the sunshield. This crease takes on the dimensions of a channel, as shown in FIG. 12. The pressure and heat imposed by members 54A and 54B, respectively, combine to substantially flatten insulating layer 26 to an insignificant width, pressing and adhering the reflective layers 52A and 52B together. As such, two sides and a bottom of the crease channel are formed by reflective layer 52A, wherein the bottom is adjacent to, and substantially flush with, reflective layer 52B at a point 56. The creases provide the structural rigidity necessary for maintaining a "rigid" posture, without significantly interfering with the flexibility of the sunshield.

Figure 13:
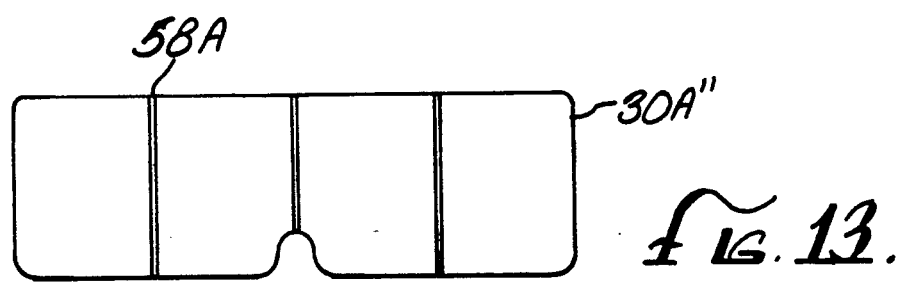
FIGS. 13-15 show front, back and end views, respectively, of a sunshield embodying the second aspect of the present invention.
Figure 14:
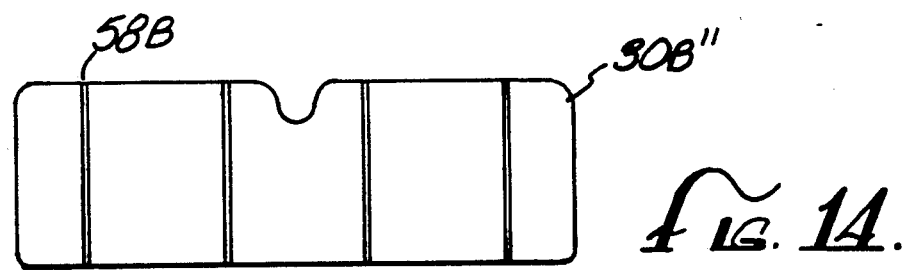
Figure 15:
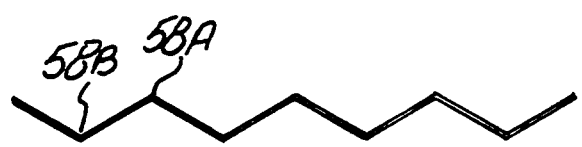

This second aspect of the present invention is illustrated by FIGS. 13-15. FIG. 13 shows a front side 30A" of shield 20", having a plurality of front side creases 58A. FIG. 14 shows a back side 30B" of sunshield 20", having a plurality of back side creases 58B. In FIG. 15, an end view of the same embodiment is shown, illustrating a somewhat accordion shape of sunshield 20" with the plurality of front side creases 58A and the plurality of back side creases 58B creating alternating bends in the body of the sunshield.

FIG. 16 illustrates sunshield 20" folded accordion style and tied by strap 22. The creases facilitate the folding of the sunshield for storage, while not causing the sunshield to tend to "fold itself" while in use. Further, the sunshield may be folded along a particular crease in either direction. As such, the sunshield may be folded accordion style, i.e., alternately folded so that each section of the sunshield between a successive pair of creases lies adjacent to a portion of the preceding and/or successive section, respectively, or in some other fashion, e.g., folded in half successively.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A sunshield having a length, a width, and two opposing sides, comprising:
   two or more adjacent layers of thin, flexible material joined for forming a semi-rigid, flexible sheet; and
   a thin, flexible support band provided between two adjacent layers of material, located proximate the mid point of the width of the sunshield and extending substantially the entire length of the sunshield, said support band having an arcuate cross-section, and said support band providing a supporting rigidity across the length of the sunshield when the sunshield is flat and allowing forced folding and rolling of the sunshield along the length for storage.

2. The sunshield of claim 1, wherein the support band is made of metal.

3. The sunshield of claim 1, where the arcuate cross-section has a V-shaped portion proximate its center.

4. The sunshield of claim 1, additionally including one or more straps for securing the sunshield in a particular position.

5. The sunshield of claim 1, additionally including one or more suction cups to facilitate securing the sunshield to a window.

6. A sunshield having a length, a width, and two opposing sides, comprising:
   one or more thin, flexible inner layers of material for forming a semi-rigid sheet, wherein at least one of said flexible inner layers is comprised of a foam material; and a plurality of creases in the sunshield in substantially parallel relationship, said creases being alternately located on opposing sides of the sunshield, each crease forming a narrow channel on a respective side of the sunshield and extending across the width of the sunshield said channel having a bottom substantially flush with and parallel to an opposing side of the sunshield,
   wherein said creases are formed by pressing a high temperature die against one side of the sunshield and causing the foam material to be permanently compressed toward the opposing side of the sunshield.

7. The sunshield of claim 6, additionally including one or more straps for securing the sunshield in a particular position.

8. The sunshield of claim 6, additionally including one or more suction cups to facilitate securing the sunshield to a window.